United States Patent
Sasaki et al.

(10) Patent No.: US 6,785,473 B1
(45) Date of Patent: Aug. 31, 2004

(54) WDM NETWORK AND WDM NETWORK DEVICE

(75) Inventors: Shinobu Sasaki, Tokyo (JP); Tatsuya Shiragaki, Tokyo (JP); Shinya Nakamura, Tokyo (JP); Takashi Yamazaki, Tokyo (JP)

(73) Assignee: NEC Corp. (JP)

( * ) Notice: Subject to any disclaimer, the term of this patent is extended or adjusted under 35 U.S.C. 154(b) by 0 days.

(21) Appl. No.: 09/519,770

(22) Filed: Mar. 7, 2000

(30) Foreign Application Priority Data

Apr. 22, 1999 (JP) .......................................... 11-115484

(51) Int. Cl.$^7$ ............................................... H04J 14/02
(52) U.S. Cl. ............................... 398/79; 398/4; 398/5; 398/10; 398/12; 398/13; 398/16; 398/17; 398/19; 398/20; 398/45; 398/50; 398/56; 398/57; 398/31; 398/33; 398/59; 370/242; 370/243; 370/245; 370/246; 370/248; 370/506; 370/535
(58) Field of Search ........................... 398/4, 5, 10, 13, 398/12, 16, 20, 19, 45, 33, 31, 50, 56, 59, 17, 57; 370/242, 246, 248, 243, 245, 506, 535

(56) References Cited

U.S. PATENT DOCUMENTS

| | | | | |
|---|---|---|---|---|
| 5,598,403 A | * | 1/1997 | Tatsuki ....................... 370/221 |
| 5,757,526 A | * | 5/1998 | Shiragaki et al. ........... 359/110 |
| 5,903,370 A | * | 5/1999 | Johnson ....................... 398/59 |
| 5,914,798 A | * | 6/1999 | Liu ............................. 359/161 |
| 6,038,678 A | * | 3/2000 | Fukushima et al. ............. 714/4 |
| 6,094,442 A | * | 7/2000 | Okamoto et al. ........... 370/506 |
| 6,097,696 A | * | 8/2000 | Doverspike .................. 370/216 |
| 6,285,475 B1 | * | 9/2001 | Fee ................................ 398/9 |
| 6,304,346 B1 | * | 10/2001 | Sawada et al. ............. 359/110 |

FOREIGN PATENT DOCUMENTS

| | | |
|---|---|---|
| JP | 2-22947 | 1/1990 |
| JP | 7-30572 | 1/1995 |
| JP | 7-235953 | 9/1995 |
| JP | 10-79757 | 3/1998 |
| JP | 10-98489 | 4/1998 |
| JP | 10-243007 | 9/1998 |
| WO | WO 98/25365 | 6/1998 |

OTHER PUBLICATIONS

Japanese Office Action issued Jun. 4, 2002 (w/English translation of relevant portions).
Canadian Office Action issued Feb. 18, 2004.

* cited by examiner

*Primary Examiner*—Hanh Phan
(74) *Attorney, Agent, or Firm*—Dickstein, Shapiro, Morin & Oshinsky, LLP.

(57) ABSTRACT

Disclosed is a WDM network which has: a lightwave path which connects between clients and each of which is provided with an overhead, and a sub-network which is defined by dividing the WDM network. In this WDM network, the sub-network has a partial lightwave path to go through the sub-network, the overhead has a partial lightwave path supervisory control information region which is terminated at both nodes of the partial lightwave path, and when a fault occurs on a lightwave path, the fault information of partial lightwave path including the position information of fault occurred is added to the partial lightwave path supervisory control information region of the overhead.

5 Claims, 3 Drawing Sheets

WDM NETWORK AND WDM NETWORK DEVICE

FIELD OF THE INVENTION

This invention relates to a fault recovery system by unit of wavelength for WDM (wavelength division multiplexing) network.

BACKGROUND OF THE INVENTION

In order to recover a fault by unit of lightwave path, it is necessary to detect the fault information by unit of lightwave path. In ITU-T G.872 (International Telecommunication Union-T Recommendation G.872), lightwave path to connect between clients is defined as OCH (optical channel), and fault information etc. to be defined in the section of lightwave path is defined as overhead to be assigned to OCH.

In conventional WDM networks, recovering a fault by unit of wavelength-multiplexed signal, i.e. fiber, is generally performed because of its easiness, and recovering a fault by unit of lightwave path is scarcely performed.

One example is a system that when a fault of lightwave path is detected through the overhead of OCH by nodes at the both ends, for the purpose of recovering the fault, the exchange of fault information or switching information from one or both of the nodes to detect the fault is conducted between the nodes at both ends, determining a suitable auxiliary lightwave path to connect between the same nodes, and switching to the auxiliary lightwave path is conducted between the nodes.

In FIG. 1, this system is explained. A WDM network 101 is composed of six nodes 111 to 116. Clients 121 and 122 are connected by a lightwave path 131 at both ends of which nodes 111 and 116 are located. When some fault (141) occurs between the nodes 115 and 116 on the lightwave path 131, various auxiliary lightwave paths, e.g. another path 132 that goes through the same route as the lightwave path 131 but is composed of a wavelength combination different from that of the lightwave path 131 and a lightwave path 133 that goes through another route, can be selected depending on the selection of route and wavelength. The end nodes 111, 116 detecting the fault on the lightwave path exchange information each other, determining a suitable auxiliary lightwave path according to the state of fault from the various paths selectable.

Also, another example is a system that a single ring network is assumed as a system for switching by unit of lightwave path and the switching is conducted by nodes at the both ends of lightwave path (Shiragaki et al., IEICE '98 General Conference, B-10-147).

In FIG. 2, this system is explained. A ring network 201 is composed of six nodes 211 to 216. Clients 221, 222 included here are connected through a lightwave path 231 using a wavelength λn and having end nodes 211, 214. When some fault (241) occurs between the nodes 212 and 213 on the lightwave path 231, the nodes 211, 214 switch to a lightwave path 232 using a wavelength λn routing the opposite side of the lightwave path 231. In this system, since the selection of auxiliary lightwave path is simplified by limiting the target system to the ring topology, it is advantageous in the simplifying and speed-up of signaling.

In the first conventional system in FIG. 1, provided that the network has a large-scale and complicated composition, the network design and the recovery procedure of signaling must be complicated. Namely, when selecting a suitable auxiliary path in the occurrence of fault, it is impossible to select a suitable route, though not optimum, from the large amount of auxiliary routes in a short time (it is said, several tens milliseconds in basic transmission system) Even if determined in advance, the load of design increases because the number of possible routes increases exponentially to the scale, therefore the entire design has to be widely redesigned every time the network is renewed. In fact, even in the very simple network in FIG. 1, there are many paths selectable. Also, with regard to signaling, a protocol or message format applicable without depending on the composition and scale of network has to be defined taking the extension of network into account. But, probably, it will be very complicated. Further, it is very difficult to offer a stable performance in arbitrary form of network.

In the second conventional system in FIG. 2, the application range is limited to the single ring network. In a network form, which is typical in configuring a ring network, that multiple ring networks are connected each other, when it is applied to lightwave path defined over the multiple ring networks, there occurs a problem similar to that of the system in FIG. 1.

SUMMARY OF THE INVENTION

Accordingly, it is an object of the invention to provide a WDM network that even in a complicated or large-scale network system, the load of switching processing at both ends of lightwave path can be reduced.

It is a further object of the invention to provide a WDM network device suitable for the operation of such a WDM network.

According to the invention, a WDM network, comprises:
 a lightwave path which connects between clients and each of which is provided with an overhead, and
 a sub-network which is defined by dividing the WDM network;
 wherein the sub-network includes a partial lightwave path to go through the sub-network, the overhead includes a partial lightwave path supervisory control information region which is terminated at both nodes of the partial lightwave path, and when a fault occurs on a lightwave path, the fault information of partial lightwave path including the position information of fault occurred is added to the partial lightwave path supervisory control information region of the overhead.

According to another aspect of the invention, a WDM network device for composing a connection node between adjacent sub-networks of multiple sub-networks composing a WDM network, comprises:
 a partial lightwave path supervisory control information terminating section which monitors a partial lightwave path supervisory control information region in an overhead for a lightwave path to go through the self-node;
 a signaling processing section which exchanges information for switching to another node in the sub-network which includes the fault position to determine an auxiliary partial lightwave path when the partial lightwave path supervisory control information terminating section detects that the fault occurred on a partial lightwave path exceeds a given level;
 a switching control section which controls the switching of partial lightwave path based on information of the auxiliary partial lightwave path determined; and
 a path setting section which switches the partial lightwave path to the auxiliary partial lightwave path by the control of the switching control section.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
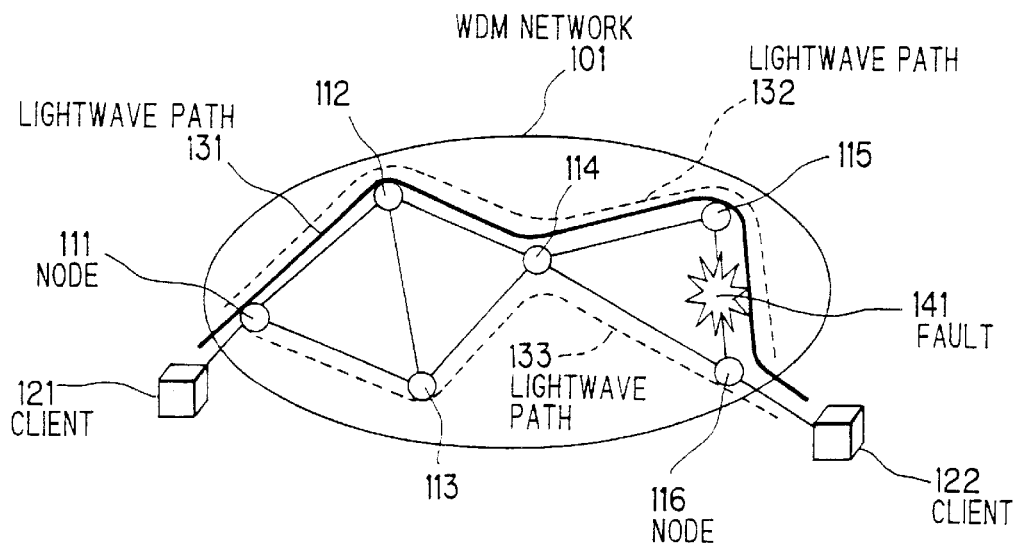
FIG. 1 is an illustration showing the composition of the first conventional network system described above.

The preferred embodiments according to the invention will be explained below, referring to the drawings.

Figure 3:
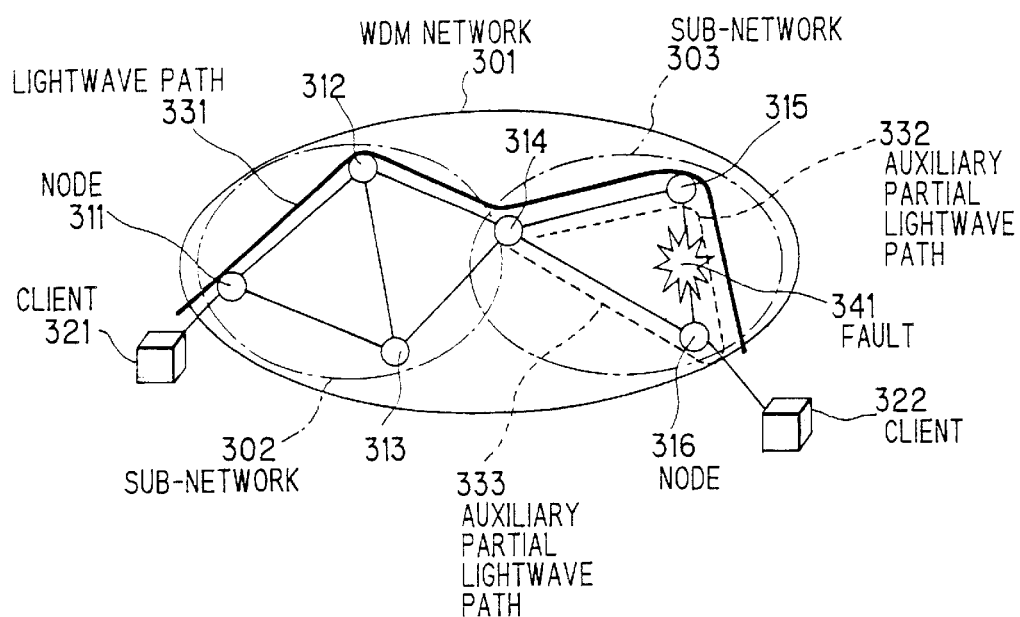
FIG. 3 is an illustration showing the composition of a WDM network in a first preferred embodiment according to the invention.

FIG. 3 shows a network composition in the first preferred embodiment according to the invention, which is shown similarly to that in the conventional system in FIG. 1. A WDM network 301 is composed of six nodes 311 to 316, and there is a lightwave path 331 connecting between clients 321 and 322. In this WDM network 301, sub-networks 302 and 303 are defined. Here, in regard to the sub-network 303, a partial lightwave path on the lightwave path 331 in the sub-network 303 has nodes 314, 316 at both ends, and goes through the node 315.

Here, when a fault (341) occurs between the nodes 315 and 316, either or both of the nodes 314, 316 as end nodes of the partial lightwave path detect the fault on the partial lightwave path by referring to the partial lightwave path supervisory control region in the overhead. However, since the fault information is terminated here, the fault information is not propagated to another sub-network, such as the sub-network 302. The nodes 314 and 316 detecting the fault exchange information each other, and determine an auxiliary path to recover the partial fault lightwave path in the sub-network 303. In this case, as the alternatives, another partial lightwave path 332 which goes through the same path as the partial lightwave path in the sub-network 303 and is composed of a different wavelength combination, and a lightwave path 333 which goes through a different path are available. Further, the alternative can increase by combinations of wavelength. However, since only the sub-network 303 has to be considered in this system, it is obvious that the number of possible alternatives can be reduced significantly compared with the switching at both ends in the conventional system. Furthermore, the number of nodes to be related to the switching procedure including the information exchange by signaling can be reduced by half. Thus, the influence of the switching procedure to the network can be localized.

Figure 2:
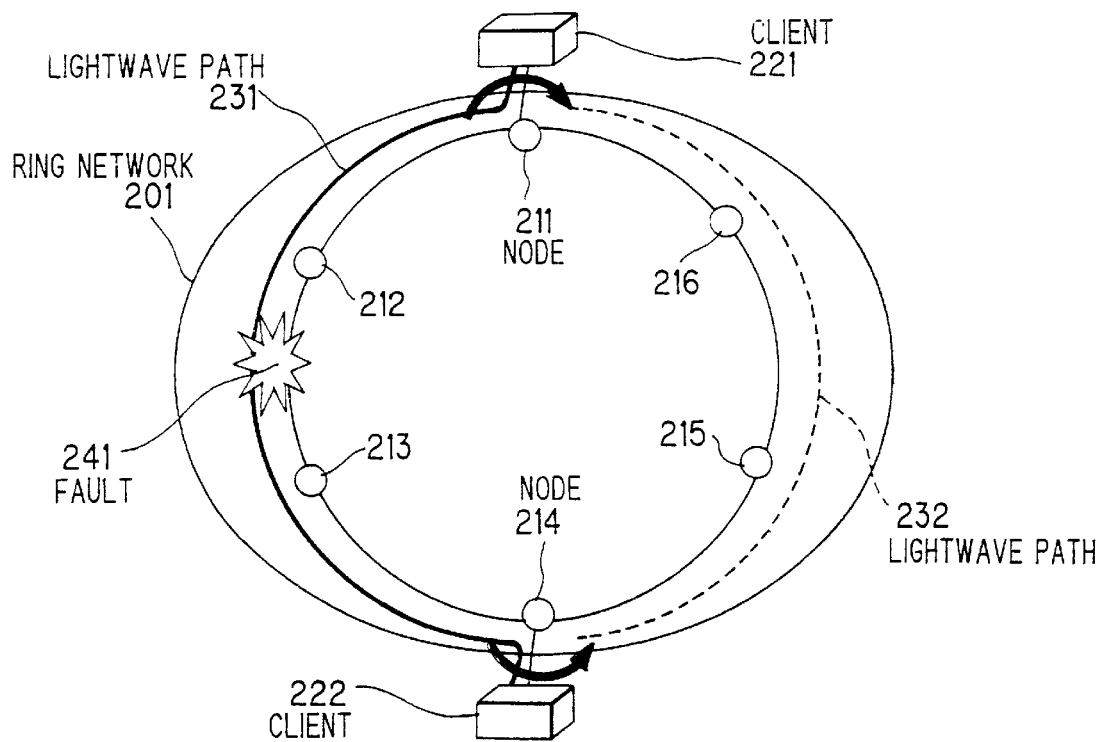
FIG. 2 is an illustration showing the composition of the second conventional network system described above.
Figure 4:
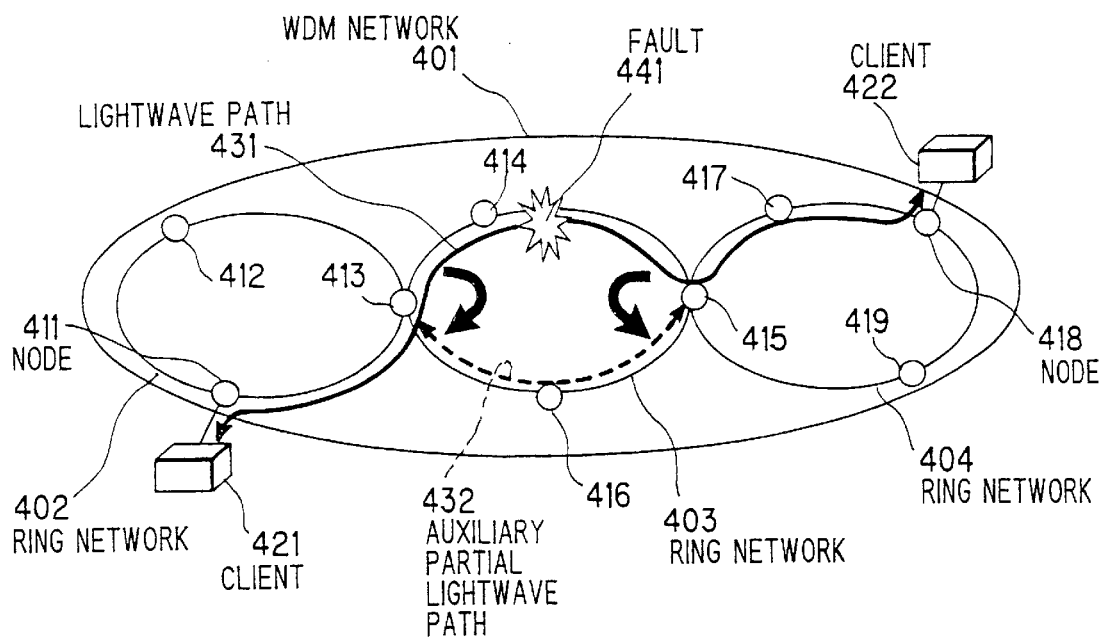
FIG. 4 is an illustration showing the composition of a WDM network in a second preferred embodiment according to the invention.

FIG. 4 shows a network composition in the second preferred embodiment according to the invention, which corresponds to the case that multiple ring networks by the conventional system in FIG. 2 are connected. In FIG. 4, three ring networks 402 to 404 connected each other compose a WDM network 401. Nodes 411 to 419 are included in this network. In each ring network, the switching of lightwave path in the single ring as shown in the conventional system is allowed. When, viewing from the WDM network 401, each of the ring networks 402 to 404 is defined as a sub-network, the sub-networks 402 and 403 are connected through the node 413 and the sub-networks 403 and 404 are connected through the node 415. Also, when a lightwave path 431 connecting clients 421 and 422 is set on the WDM network, it can be divided into three partial lightwave paths corresponding to the sub-networks.

When a fault (441) occurs on the partial lightwave path on the sub-network 403 between the nodes 414 and 415, either or both of the nodes 413, 415 as end nodes of the partial lightwave path detect the fault on the partial lightwave path by referring to the partial lightwave path supervisory control region in the overhead. However, since the fault information is terminated here, the fault information is not propagated to the adjacent sub-networks 402, 404. The nodes 413, 415 detecting the fault switch the partial lightwave path in the sub-network 403 to an auxiliary partial lightwave path 432 by applying the switching function by unit of lightwave path, which is originally provided by unit of ring network, to the partial lightwave path. At this time, the switching of partial lightwave path is not conducted in the other sub-network.

Figure 5:
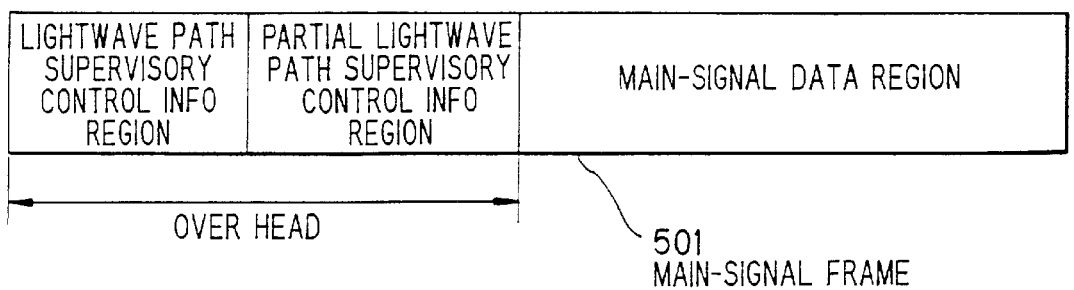
FIG. 5 is a signal format diagram showing an overhead in which partial lightwave path supervisory control information region is contained.

FIG. 5 shows a format example in which the overhead in the above embodiments is defined in a TDM (time division multiplexing) frame. In this example, besides a supervisory control information region for entire lightwave path, a supervisory control information region for partial lightwave path is defined as part of the overhead of main-signal frame 501. In this supervisory control information region for partial lightwave path, fault control information by unit of partial lightwave path is included. Although in this example the overhead is multiplexed with main signal in the TDM frame, it may be multiplexed by using another system, such as frequency etc. Also, the fault information of partial lightwave path may be given as partial information of path fault information created to monitor the fault of the entire lightwave path.

Figure 6:
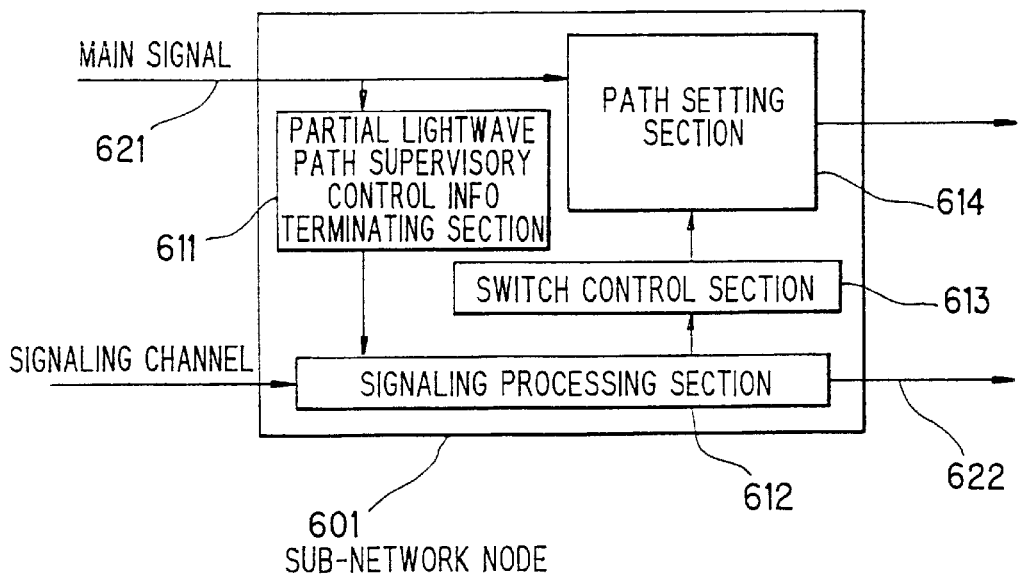
FIG. 6 is a block diagram showing the composition of a connection node between sub-networks used in the first and second embodiments.

FIG. 6 shows the composition of a connection node, i.e. node to terminate the partial lightwave path, between sub-networks in the above embodiments. A partial lightwave path supervisory control information terminating section 611 terminates the partial lightwave path supervisory control information region in the overhead of main signal 621 input to a node 601. The section 611 detects a fault occurring in the sub-network, and when exceeding a given fault level, it notifies a signaling processing section 612 of the fault information. The signaling processing section 612 exchanges fault information or switching control information with another node composing the sub-network through a signaling channel 622, determining an auxiliary partial lightwave path, then notifying a switching control section 613 of this path information. The switching control section 613 controls a path setting section 614, according to the received auxiliary partial lightwave path information, to conduct the switching to the partial lightwave path.

Advantages of the Invention

According to the invention, a WDM network is divided into multiple sub-networks. Thereby, a region where recovery of fault is conducted can be localized. Therefore, even in a complicated or large-scale network system, the alternative of auxiliary path can be reduced significantly and the number of regions, i.e. nodes, to operate the processing the notification of fault, selection of auxiliary path, switching etc. can be reduced according to need.

Also, by setting the sub-network by a suitable unit, stable function and performance can be yielded.

Furthermore, especially in a multi-ring network system where multiple ring networks each of which having a lightwave path switching function are connected, each ring is set as a sub-network and a lightwave path in each sub-network is divided into partial lightwave paths and the lightwave path switching function in ring network is applied to the partial lightwave path. Thereby, the fault control system by unit of ring network that is relatively easy to define can be easily expanded to a large-scale network.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A WDM network having a plurality of nodes comprising:

a lightwave path which connects between clients, each of which is provided with an overhead, and at least one sub-network containing a subset of said plurality of nodes;

wherein said sub-network includes at least one partial lightwave path from a first node to a second node of said subset of said plurality of nodes, said overhead includes a partial lightwave path supervisory control information region which is read at each of said first and second nodes of said partial lightwave path, and when a fault occurs on said at least one partial lightwave path in said sub-network, fault information of a partial lightwave path including fault position information is added to said partial lightwave path supervisory control information region of said overhead.

2. The WDM network, according to claim 1, wherein:

said fault information of said partial lightwave path is defined as partial information of path fault information created to monitor the fault of entire lightwave path.

3. The WDM network, according to claim 1, wherein:

when a fault occurs on said lightwave path, nodes at both ends of the partial lightwave path including the fault are added to said partial lightwave path supervisory control information region of said overhead, so that the partial lightwave path including the fault position is switched to an auxiliary partial lightwave path in the sub-network to which said partial lightwave path including the fault position belongs.

4. The WDM network, according to claim 1, wherein:

said WDM network is composed of multiple ring networks which are connected to each other and each of which has a fault recovering function by unit of lightwave path, when the lightwave path on said WDM network is formed over multiple ring networks, each of said ring networks being set as a sub-network, a fault occurred on said lightwave path is subject to a switching processing for fault-recovering using said fault recovering function in each sub-network only in the sub-network in which said fault occurs, so that said switching processing for fault-recovering is not conducted in another sub-network in which said fault does not occur.

5. A WDM network connection node device between adjacent sub-networks of a multiple sub-network WDM network, comprising:

a partial lightwave path supervisory control information terminating section which monitors a partial lightwave path supervisory control information region in an overhead;

a signaling processing section which exchanges information for switching to another node in the sub-network when said partial lightwave path supervisory control information terminating section detects a fault on a first partial lightwave path;

a switching control section which controls the switching from a first partial lightwave path to a second partial lightwave path based on said partial lightwave path supervising control information; and a path setting section which switches from said first partial lightwave path to said second partial lightwave path.

* * * * *